Dec. 2, 1952     A. C. PARKHURST     2,619,766
MOUSETRAP
Filed Sept. 6, 1949
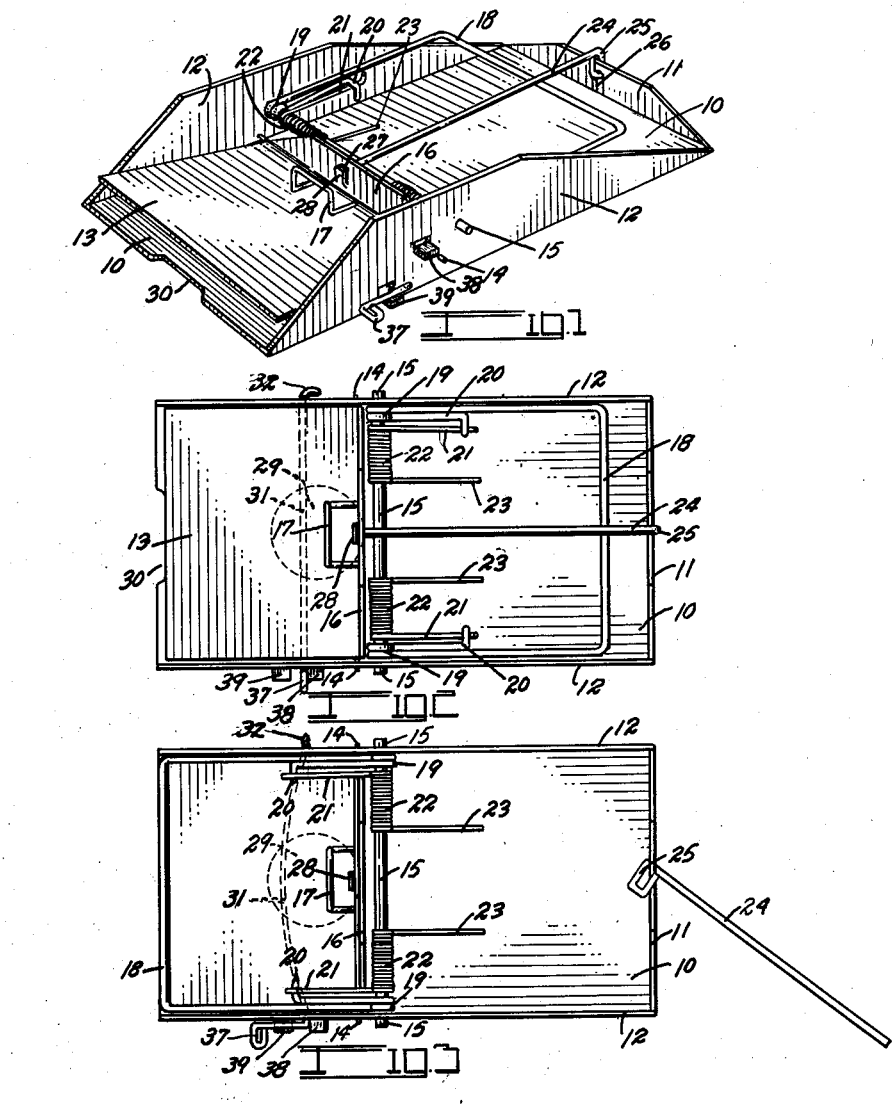
INVENTOR.
ARTHUR C. PARKHURST
BY
ATTORNEY Patented Dec. 2, 1952

2,619,766

UNITED STATES PATENT OFFICE 2,619,766

MOUSETRAP

Arthur C. Parkhurst, Denver, Colo.

Application September 6, 1949, Serial No. 114,204

1 Claim. (Cl. 43—81)

This invention relates to a mouse trap, and has for its principal object the provision of a mouse trap which will be much more sensitive than present mouse traps, and which will be so constructed that it will be impossible for a rodent to reach the bait without setting off the trap.

Another object of the invention is to construct a mouse trap of the treadle spring type which can be set and baited without danger to the fingers.

A further object is to so construct the trap that it can be economically stamped from sheet metal.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of the improved mouse trap in the "set" position;

Fig. 2 is a plan view of the trap in the "set" and locked position;

Fig. 3 is a plan view thereof in the released position; and

Fig. 4 is an end view thereof in the position of Fig. 2.

The improved trap is founded on a unitary blank of sheet metal cut and formed to produce an elongated, rectangular, flat bottom plate 10 which is turned upwardly along its rear edge to form an end flange 11, and along its side edges to form side flanges 12. The ends of both the end flange 11 and the side flanges 12 are beveled on an incline to avoid sharp corners, as indicated in Fig. 1.

A rectangular treadle plate 13 is positioned between the side flanges 12 and is mounted at its inner edge on a transversally extending hinge pin 14. The rear extremity of the treadle plate is turned upwardly to form a locking flange 16. A wire bait loop 17 having an inverted U-shape is soldered or otherwise secured to the treadle plate 13 forwardly of the flange 16. The extremities of the hinge pin 14 extend outwardly through openings in the side flanges 12 immediately above the bottom 10 to form a hinged mounting for the treadle plate 13.

A spring shaft 15 extends transversally across the trap and projects through bearing openings in the side flanges 12. The shaft 15 is positioned above and slightly rearwardly from the hinge pin 14.

A wire-like, U-shaped trap jaw member 18 is wound adjacent its two extremities, as shown at 19, about the shaft 15. The latter two extremities then extend within the U-shaped trap jaw 18 and in substantially the same plane therewith and are then turned inwardly toward each other to form hooked ends 20 which overlie the extremities 21 of coil springs 22.

The coils of the springs 22 surround the shaft 15 and extend forwardly at their inner extremities to form pressure ends 23 for the spring. The pressure ends 23 act downwardly against the bottom plate 10, and the other ends 21 act upwardly against the hooked extremities 20 of the trap jaw member 18. The jaw member 18 is also formed from resilient spring wire so that there is a secondary spring action in the wound portions 19 and in the projecting hooked ends 20 thereof.

The jaw member is held in the set position of Figs. 1 and 2 by means of a trigger wire 24. The trigger wire is downwardly looped at its one extremity, as shown at 25, and this loop is locked through a receiving opening 26 in the flange 11 to hingedly mount the trigger wire 24 thereon. The other extremity of the trigger wire extends into a trigger opening 27 in the flange 16 and bears against a stop tongue 28. The stop tongue 28 is formed by indenting the metal of the flange 16 forwardly so as to produce the trigger opening 27.

The bottom plate 10 is provided with a finger opening 29 below the treadle plate 13, and with a finger notch 30 below the free extremity of the treadle plate.

Let us assume that bait has been placed under the bait loop 17. It will be noted that it is impossible for a rodent to reach this bait without depressing the treadle plate. This is due, first, to the fact that the treadle plate covers the complete width of the bottom plate so that the rodent cannot rest his weight upon the latter; second, to the fact that the relatively high side flanges 12 prevent the rodent from reaching the bait from the sides of the trap. The mouse must therefore depress the treadle plate.

The amount of pressure required to depress this plate is exceedingly slight since the trap jaw 18 acts against the trigger member 24 very close to the hinge point of the latter, and since the extremity of the trigger member can only extend into the flange 16 a very slight distance, due to the limiting tongue 28. Therefore, a very sensitive action is obtained.

The speed with which the jaw member 18 will reach the position of Fig. 3 is accelerated by the double spring action of both the resilient jaw member 18 and the springs 22.

The finger hole 29 and the notch 30 are safety features which allow the treadle plate 13 to be forced to the locking position from below the bottom plate by inserting the finger therethrough, so that the fingers are never in the path of the spring jaw 18.

To still further enhance the safety of the improved trap, a bowed locking wire 31 is inserted through both the side flanges 12 beneath the treadle plate 13 immediately above the bottom plate 10. The wire 31 is bent at its one extremity, as shown at 32, to prevent its being withdrawn from the trap. The other extremity of the wire 31 is bent at right angles to form a handle 37 on the side of one of the side flanges 12. The metal of the latter side flanges is cut and bent to form a vertical stop member 38 and a horizontal stop member 39 which stop the handle in the vertical and horizontal positions, respectively.

The wire 31 is bowed between the side flanges in the plane of the handle 37 so that when the handle is turned to the vertical position (against the stop member 38), as shown in Figs. 2 and 3, the treadle plate is locked to prevent accidental setting-off of the trap. When the handle is turned to the horizontal position (against the stop member 39), the bowed portion of the wire 31 lies upon the bottom plate 10 out of the way of the treadle plate 13 so that the trap will be released for use.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

Means for preventing accidental actuation of a mouse trap of the depressible treadle plate type wherein downward pressure on the treadle occasions release of a striker member, comprising: a base plate; an upturned side flange on each side of said base plate; a treadle mounted for pivotal movement between the side flanges above the base plate; a locking wire rotatably mounted in and extending between said side flanges, said locking wire being formed with an arcuate bow throughout its length between said flanges; a handle formed on one extremity of said wire in the plane of said bow and on the exterior of one of said side flanges; and stop members formed on said latter side flange in the path of said handle to limit the rotation of said bow to an arc of 90°.

ARTHUR C. PARKHURST.

REFERENCES CITED

The following references are of record in the file of this patent:

UNITED STATES PATENTS

| Number | Name | Date |
|---|---|---|
| 628,831 | Morgan | July 11, 1899 |
| 640,244 | Wever | Jan. 2, 1900 |
| 988,259 | Fauls | Mar. 28, 1911 |
| 1,067,526 | Larison | July 15, 1913 |
| 1,310,340 | Howe | July 15, 1919 |
| 1,709,199 | Thayer | Apr. 16, 1929 |
| 1,726,367 | Seghers | Aug. 27, 1929 |
| 1,861,479 | Kleffman | June 7, 1932 |
| 1,868,714 | Mills | July 26, 1932 |
| 2,144,956 | Arndt | Jan. 24, 1939 |
| 2,321,617 | Peterson | June 15, 1943 |
| 2,590,316 | Heal | Mar. 25, 1952 |